UNITED STATES PATENT OFFICE.

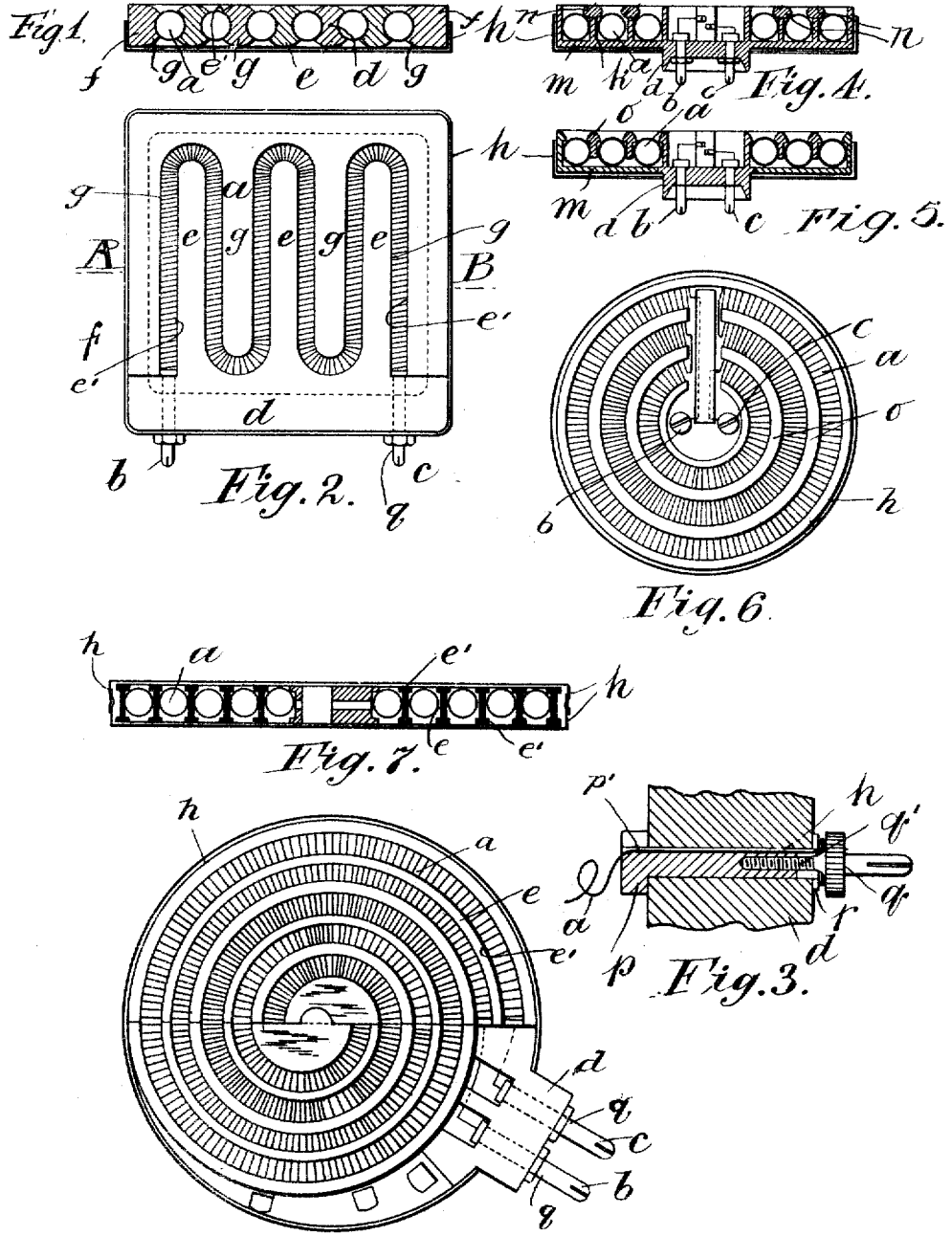

JOHN CHARLES CAMPBELL MACDONOGH, OF LONDON, ENGLAND.

ELECTRIC HEATING ELEMENT.

1,024,998.     Specification of Letters Patent.     Patented Apr. 30, 1912.

Application filed September 12, 1911. Serial No. 648,986.

*To all whom it may concern:*

Be it known that I, JOHN CHARLES CAMPBELL MACDONOGH, subject of King of Great Britain, residing at London, England, have invented certain new and useful Improvements in Electric Heating Elements, of which the following is a specification.

This invention relates to electric heating elements formed of coiled wire suitably supported and to apparatus for using such elements.

The object of the present invention is to provide a form of electrical heating element which shall be readily assembled without involving skilful or expensive operations and in which the parts may be readily renewed, while at the same time the heat from the coils or other heating material will be radiated directly to the object to be heated without requiring to pass through an insulating layer.

According to the present invention, the electric heating element consists of heating coils separated by walls of insulating material with raised and overhanging parts which hold the coils in place and protect them from contact with the object to be heated or the casing of the heating element but leaves said coils open to radiate heat directly to the object to be heated. In this way I avoid the necessity of transmitting the heat from the coil to the object to be heated through a layer of insulating material. The shape and arrangement of the insulating means may be varied within very wide limits and the heater may be arranged to provide various grades of heat. The heating elements herein described are detachable and of such a nature that no skill is required in inserting them in place or removing them.

An important feature of this invention is that the coils are free to radiate heat to both sides. Thus with a division wall of substantially I cross section the coils are held in place by the flanges both top and bottom, while the said coils are open to radiate heat both top and bottom. When applying this heater to a pot or kettle therefore, I am enabled to use a much greater heating surface. I propose to use this heating surface in kettles and pots by inserting the heating element into a side pocket, the top and bottom walls of which are in contact with the liquid to be heated and form heating surfaces. In this way there is no heat lost from the heating element. In the case of an oven, I may arrange the heating element in a hollow shelf, the upper surface forming a hot plate while the lower surface forms a grill and the shelves may be arranged movable while the contacts on the shelves co-act with bus bars in the frame of the oven.

Figure 9:
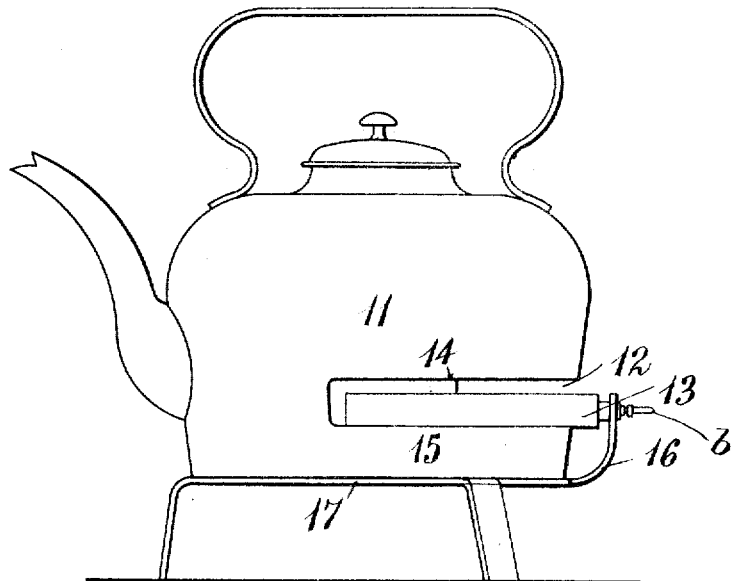
Figure 10:
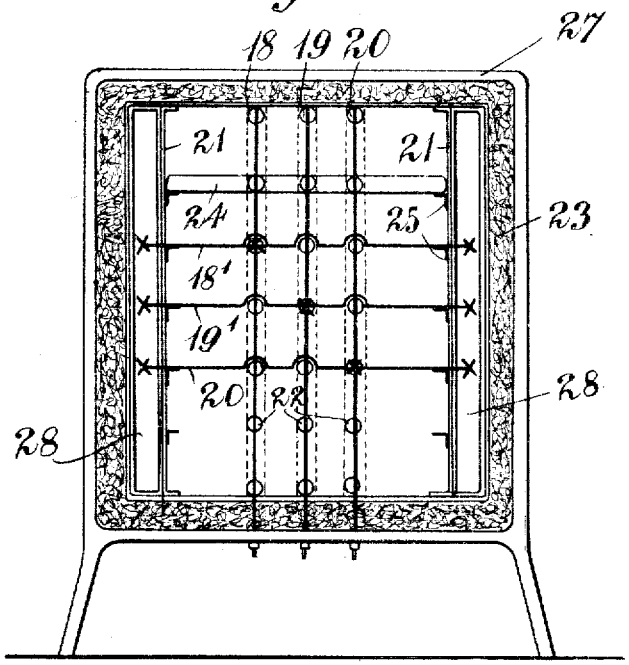

The invention will be more readily understood from the following forms chosen by way of example and illustrated in the accompanying drawings, in which:

Figure 1, is a section on the line A—B of Fig. 2 and Fig. 2, is a plan view of one form of this invention. Fig. 3, is an enlarged detail view showing one form of the terminal preferably employed. Figs. 4, and 5, are sectional views illustrating other forms of the invention. Fig. 6, is a plan view of a circular heat element having insulating pieces of the form shown in either Figs. 4 or 5. Fig. 7, is a section and Fig. 8, is a plan view of another form of this invention. Fig. 9, shows an electric heating element according to this invention applied to a kettle. Fig. 10 shows the invention applied to an oven.

According to the form of this invention shown in Figs. 1 and 2, the heating coil $a$, is continuous and is laid in any suitable sinuous form, for example in loops with straight parallel legs and is connected at each of its ends to the terminals $b$ and $c$. These terminals may be separate as shown or may be arranged closely together so as to fit any standard size of plu .

As shown in Fig. 3, the terminals $b$ and $c$, are preferably composed of two parts $p$ and $q$. Each end of the coils $a$, is passed through a sawcut or groove $p'$, on the part $p$, which is inserted in an opening in the block $d$. The part $p$, is provided with a tapped hole in which there screws the threaded part $q'$, of the externally projecting plug $q$. The wire of the coil $a$, after passing through the groove $p'$, and a washer $r$, is wound around the threaded part $q'$, and the externally projecting plug $q$, is then tightened in place. By means of this construction the actual terminal of the wire is accessible from the exterior and efficient contact is assured by the wire passing through the groove $p'$. The end of the wire is also to some extent cooled by its metallic contact with the inner part $p$. If desired the part $p$, may be extended to form the external plug and in this case an ordinary nut would engage with an external thread on the projecting part of the plug.

The terminals b, and c, are embedded in a block d, of suitable insulating material capable of standing heat. The block d, and projections e, are of the cross section shown in Fig. 1. If desired these projections may be of I shape in cross section. The essential features of the projections e, are that they form an insulating wall with overhanging parts e', which partially embrace coils a, so as to leave parts of said coils open, the amount of the overhang being less than the half diameter of the coil so that a space is left between the opposite edges of the overhanging parts. The upper surface of the projections e, is above the level of the top of the coils. The heating element is completed by an insulating block f, having projections g, of similar cross section to the projections e, on the block d. The entire element is carried by a holding frame which is conveniently in the form of a metal casing h, which may consist of both an upper and lower plate or may merely be in the form of a binding edge as indicated in the drawing.

It will be seen that by means of the present invention, a simple and effective construction is provided by which it is impossible for the coils to short circuit against the bottom surface of the kettle or other object to be heated or against the walls of the casing of the element. The projections or insulating walls e and g, also perform the function of holding the coils in place and making the entire element of simple and strong construction. It will be understood that if desired, the projections e and g, forming the insulating walls between the coils may be made separate from the blocks d, and f, as hereinafter described and their form and shape may be varied within wide limits.

Another form of the invention is illustrated in Fig. 4, as applied to a circular element in which the sinuous form of the coil is obtained by laying it in volute or substantially concentric circles. In this case, the coils a, are inclosed in annuli formed by the ribs k, and a base m. On the top of the ribs there are supported detachable rings n, which form the raised and overhanging parts of the insulating walls between the coils. Instead of providing the base piece m, with ribs as shown in Fig. 4, the coils may be simply laid concentrically in a plain casing and subsequently separated by means of rings o, having raised and overhanging parts in accordance with this invention.

The ribs k, and the rings o, are broken at one point of the circumference as shown at Fig. 6, so as to allow of the interconnection of the coils. The coils are in the form shown in Fig. 6, connected in series and two terminals b and c, are provided which project from the bottom of the heat element. If desired, however, the terminals b and c, may be arranged at the side of the element.

Another form of this invention is illustrated in Figs. 7 and 8. In this case the insulating pieces between the coils a, are of I shape in cross section and are in the form of rings arranged as a volute as shown in plan in Fig. 8.

The heating elements above described are preferably inserted loosely in place at the point required and no skill is necessary in detaching or inserting them in place.

In the form of this invention illustrated in Figs. 1 and 7, it will be seen that the coils a, are open both top and bottom to radiate heat. This enables this form of heater to be used on both sides. Thus for toasting or grilling purposes the elements might be arranged in a vertical plane and both sides would then be effective as heaters. In kettles the heating surface of the kettle would be disposed on both sides of the element and in the case of ovens the heater would be arranged horizontally as a shelf or parallel to the shelves proper so that both the upper and lower surfaces of the heater could be effective. The oven may also be provided with vertical heating elements.

For the purpose of illustrating typical ways in which this invention may be employed, I have shown the invention applied to a specific form of kettle and also to an oven.

Referring to Fig. 9, the kettle 11, is provided with a side pocket 12, in which the heater 13, is disposed. It will be seen here that the heating surfaces 14, 15, are arranged on both sides of the heater so that the maximum heating effect is produced. Of course instead of using a side pocket the kettle may be arranged in two parts connected by tubes, the heater being disposed between the parts. The essential feature is that the heating surface is disposed on both sides of the element. A clip 16, may be employed for holding the heater in place. The kettle is preferably made to rest on a stand 17, to which the clip 16, is attached.

According to the form shown in Fig. 10, the casing of an oven has bus bars, 18, 19, 20 fitted externally and these are connected to the source of current with all usual and necessary intermediate switches and the like. The heaters 24, are supported on ledges 25, fixed to uprights 21, at the sides of the oven. The terminals of the coils of the heaters engage in sleeves 22, which pass through the oven casing to connect with the bus bars 18, 19, 20, being of course suitably insulated from the casing of the oven. The oven is conveniently lagged with suitable heat insulating means as indicated by the outer lining 23. On the upper surface 27, there may be fixed stands for kettles and toasting racks so that the device shown may be used as a cooking stove somewhat after the manner of gas cooking stoves at present in use. The oven may also be fitted with vertical heating elements 28, as shown which connect to bus bars 18′, 19′ 20′, in the same manner as described above with reference to the horizontal heaters 24.

It will be seen that in all the forms described, the insulating walls perform the purposes of separating the coils, from one another and from the object to be heated, and also that of holding the coils in place. The manufacture is very simple as all the parts are loosely inserted in place so as to mutually lock one another. This also enables the parts to be readily renewed. This renovation may, in the case of coils being required, be effected very easily by inexperienced persons owing to the simple and accessible form of terminal employed. Further all the above advantages are associated with the direct radiation of heat from the coils to the object to be heated and also with the double sided radiation described above with reference to Figs. 1, 7, 9, and 10. Of course the invention may be used for a very wide variety of purposes and the above are only chosen by way of example.

I claim:

1. An electric heating element comprising in combination a holding frame, an electric heating coil in said frame and insulating holding members for said coil said holding members being of substantially the length of the coil and having side wall parts located on either side of the coil and overhanging wall parts projecting toward one another and leaving a space between said projecting parts to expose the continuous outer surface of said coil.

2. In combination with an electric heating coil, insulating means for separating and holding adjacent coil lengths having a dividing wall part and overhanging wall parts projecting over adjacent coil parts for an amount less than the half diameter of the coils, said insulating means extending the full length of the coil and exposing the outer surface thereof.

3. In combination with an electric heating coil, insulating means for separating and holding adjacent coil lengths having a dividing wall part and overhanging wall parts projecting over adjacent coil parts for an amount less than half diameter of the coils, the upper surfaces of said overhanging parts being higher than the uppermost part of the coil, said insulating means extending the full length of the coil and exposing the outer surface thereof.

4. In combination with a coil laid sinuously a dividing wall between adjacent lengths of coil and overhanging parts on said wall, said overhanging parts having less overhang than half diameter of the coil, and extending the full length of the coil.

5. In combination with an electric heating coil, a continuous insulating wall on either side of said coil and insulating projections from said walls above and below the coil said walls and projections being dimensioned to embrace the coil partially and leave parts of said coil open.

6. In combination with a sinuous electric heating coil, a dividing and holding wall of insulating material located between the lengths of said coil, said dividing and holding wall being of substantially I section extending the full length of the coil.

7. In combination with an electric insulating base, electric terminals in said base, coils laid sinuously and connected to said terminals, insulating walls arranged in loose sections between the adjacent lengths of coil and of substantially the same length as the latter, said walls having overhanging parts projecting over the full length of the coils for an amount less than half the diameter of the coil and a holding case for said recited parts said case being held from contact with the coils by said overhanging and base insulating parts.

8. In combination with an electric insulating base, electric terminals in said base, coils laid sinuously and connected to said terminals, dividing walls of insulating material between and of substantially the length of the sinuations of said coil, and insulating projections from said dividing walls above and below the coils, said walls and insulating projections being dimensioned to embrace the coil partially and leave parts of said coil open.

9. In combination with an electric insulating base, electric terminals in said base, coils laid sinuously and connected to said terminals, walls of substantially I -section located between and of substantially the length of the sinuations of said coils, and a frame for holding said recited parts.

10. In combination with electric heating coils laid sinuously in substantially concentric circles, insulating walls arranged in loose sections between and of substantially the same length as adjacent lengths of coil, said walls having overhanging parts projecting over the coils for an amount less than half diameter of the coil and a holding case for said recited parts said case being held from contact with the coils by said overhanging and base insulating parts.

11. In combination with an electric heating coil laid sinuously in substantially concentric circles a dividing wall of insulating material located between and of substantially the same length adjacent tions of the coil and projections from said walls above and below the coil, said walls and projections being dimensioned to embrace the coil partially and leave parts of said coil open and a holding case for said recited parts, said case being held from contact with the coils by said overhanging and base insulating parts.

12. In combination with an electric heating coil laid sinuously in substantially concentric circles a dividing and holding wall of insulating material located between adjacent sinuations and of substantially the same length as the coil, said wall being of substantially I section.

13. In combination with a pocketed heater an electric heating element located in said pocket and comprising sinuous electric heating coils and insulating walls of substantially I shape in cross section located between and of substantially the same length as adjacent lengths of said coil.

In testimony whereof I have signed my name to this specification in the presence of two subscribing witnesses.

JOHN CHARLES CAMPBELL MACDONOGH.

Witnesses:
H. MATHYS,
P. S. H. ALEXANDER.